United States Patent
Wu et al.

(10) Patent No.: US 10,735,228 B2
(45) Date of Patent: Aug. 4, 2020

(54) UPLINK ACCESS METHOD, APPARATUS, AND SYSTEM

(71) Applicant: HUAWEI TECHNOLOGIES CO., LTD., Shenzhen, Guangdong (CN)

(72) Inventors: Yiqun Wu, Shanghai (CN); Shunqing Zhang, Shenzhen (CN); Yan Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 171 days.

(21) Appl. No.: 15/218,095

(22) Filed: Jul. 25, 2016

(65) Prior Publication Data
US 2016/0337149 A1    Nov. 17, 2016

Related U.S. Application Data

(63) Continuation of application No. PCT/CN2014/071773, filed on Jan. 29, 2014.

(51) Int. Cl.
| | | |
|---|---|---|
| H04L 1/00 | (2006.01) | |
| H04L 25/03 | (2006.01) | |
| H04B 7/0456 | (2017.01) | |
| H04L 5/00 | (2006.01) | |
| H04W 74/08 | (2009.01) | |
| H04B 7/0404 | (2017.01) | |

(52) U.S. Cl.
CPC ..... *H04L 25/03904* (2013.01); *H04B 7/0456* (2013.01); *H04L 5/0048* (2013.01); *H04W 74/08* (2013.01); *H04B 7/0404* (2013.01)

(58) Field of Classification Search
CPC .................................................. H04L 5/0048
See application file for complete search history.

(56) References Cited

U.S. PATENT DOCUMENTS

| | | |
|---|---|---|
| 6,757,272 B1 | 6/2004 | Abeta et al. |
| 6,967,936 B1 | 11/2005 | Laroia et al. |
| 2007/0110140 A1 | 5/2007 | Howard et al. |

(Continued)

FOREIGN PATENT DOCUMENTS

| | | |
|---|---|---|
| CN | 1248361 A | 3/2000 |
| CN | 101087170 A | 12/2007 |

(Continued)

OTHER PUBLICATIONS

Kelvin Au et al. Uplink contention based SCMA for 5G radio access, IEEE Globecom Workshop,2014. total 6 pages.

(Continued)

*Primary Examiner* — Ayanah S George
(74) *Attorney, Agent, or Firm* — Leydig, Voit & Mayer, Ltd

(57) ABSTRACT

The present application provides a method for a terminal device to transmit uplink service data to a base station. The terminal device obtains uplink service data from a user input in a service session. The terminal device obtains a codebook from a preset codebook set of the terminal and a pilot sequence corresponding to the codebook. The terminal device generates an uplink data signal according to the codebook and the uplink service data, and generates a pilot signal corresponding to the pilot sequence. The terminal device transmits the uplink data signal and the pilot signal to the base station.

22 Claims, 7 Drawing Sheets

(56) References Cited

U.S. PATENT DOCUMENTS

| | | | | |
|---|---|---|---|---|
| 2008/0205451 | A1* | 8/2008 | Ramesh | H04L 5/0007 370/491 |
| 2008/0212700 | A1 | 9/2008 | Han et al. | |
| 2009/0111445 | A1* | 4/2009 | Ratasuk | H04B 7/2662 455/418 |
| 2009/0180561 | A1 | 7/2009 | Kim et al. | |
| 2009/0274105 | A1* | 11/2009 | Choi | H04L 5/0016 370/329 |
| 2010/0150266 | A1 | 6/2010 | Mondal et al. | |
| 2010/0172314 | A1 | 7/2010 | Lim et al. | |
| 2010/0177842 | A1* | 7/2010 | Chang | H04L 5/0007 375/295 |
| 2010/0232525 | A1 | 9/2010 | Xia et al. | |
| 2011/0085453 | A1 | 4/2011 | Wu et al. | |
| 2011/0085620 | A1 | 4/2011 | Measson et al. | |
| 2011/0090985 | A1 | 4/2011 | Zhou et al. | |
| 2011/0244816 | A1 | 10/2011 | Mori et al. | |
| 2011/0261858 | A1* | 10/2011 | Baldemair | H04W 72/0413 375/130 |
| 2012/0063344 | A1 | 3/2012 | Ohm et al. | |
| 2012/0099666 | A1 | 4/2012 | Baldemair et al. | |
| 2012/0183020 | A1* | 7/2012 | Koike-Akino | H04L 1/0034 375/219 |
| 2013/0129008 | A1* | 5/2013 | Ko | H04B 7/0473 375/295 |
| 2014/0140313 | A1 | 5/2014 | Liu et al. | |
| 2014/0254544 | A1 | 9/2014 | Kar Kin Au et al. | |
| 2014/0334460 | A1 | 11/2014 | Ko et al. | |
| 2015/0103933 | A1 | 4/2015 | Nagata et al. | |
| 2015/0110213 | A1 | 4/2015 | Parkvall et al. | |

FOREIGN PATENT DOCUMENTS

| | | |
|---|---|---|
| CN | 101621848 A | 1/2010 |
| CN | 101931447 A | 12/2010 |
| CN | 102232319 A | 11/2011 |
| CN | 102468947 A | 5/2012 |
| CN | 102625454 A | 8/2012 |
| CN | 102882657 A | 1/2013 |
| CN | 103152090 A | 6/2013 |
| EP | 2141824 A1 | 1/2010 |
| EP | 2449694 A1 | 5/2012 |
| JP | 2001257641 A | 9/2001 |
| JP | 2009516443 A | 4/2009 |
| JP | 2011525763 A | 9/2011 |
| JP | 2013128325 A | 6/2013 |
| KR | 20100081898 A | 7/2010 |
| RU | 2442280 C1 | 2/2012 |
| RU | 2538180 C2 | 1/2015 |
| WO | 2008053074 A1 | 5/2008 |
| WO | 2010102435 A1 | 9/2010 |
| WO | 2010151092 A2 | 12/2010 |
| WO | 2011000110 A2 | 1/2011 |
| WO | 2011032297 A1 | 3/2011 |
| WO | 2012027819 A1 | 3/2012 |
| WO | 2013161593 A1 | 10/2013 |
| WO | 2013169160 A1 | 11/2013 |

OTHER PUBLICATIONS

C. Bockelmann et al. Compressive sensing based multi-user detection for M2M communication, Eur. Trans. Telecomms. 2013. total 12 pages.

Andrea Zanella et al. M2M massive wireless access: challenges, research issues, and ways forward, IEEE Globecom workshop, 2013. total 7 pages.

Kaijie Zhou et al. Contention based access for machine-type communications over LTE, IEEE VTC Spring, 2012. total 5 pages.

Petar Popovski et al. Deliverable D2.2 ,Novel radio link concepts and state of the art analysis ,ICT-317669-METIS/D2.2 ,Oct. 31, 2013. total 79 pages.

3gpp TSG RAN WG1 meeting #49 R1-072155,Motorola: "proposal for dedicated pilots in downlink precoding for EUTRA MIMO" , May 2, 2007. total 5 pages.

3gpp TSG RAN WG1 meeting #68, R1-120475,Alcatel-lucent et al: "pilot design for 4-branch HSDPA", Jan. 31, 2012.total 4 pages.

Hosein Nikopour et al.,"Sparse Code Multiple Access", 2013 IEEE 24th International Symposium on Personal, Indoor and Mobile Radio Communications; Fundamentals and PHY Track,total 5 pages.

JP 2016-549144 & CN 20140073595.1, JP Notice of Allowance, CN Office Action and Search Report, dated May 15, 2018 & dated Apr. 25, 2018.

* cited by examiner

UPLINK ACCESS METHOD, APPARATUS, AND SYSTEM

CROSS-REFERENCE TO RELATED APPLICATIONS

This application is a continuation of International Application No. PCT/CN2014/071773, filed on Jan. 29, 2014, which is hereby incorporated by reference in its entity.

TECHNICAL FIELD

The present application relates to the communications field, and in particular, to an uplink access method, apparatus, and system.

BACKGROUND

In a wireless communications system, within a coverage area of a base station, when users at different locations use a same transmission medium to perform uplink access, the base station needs to use a multiple access technology to distinguish between different user signals. For example, using Sparse Code Multiple Access (SCMA) technology, which is a hybrid multiple access technology combined by Time Division Multiple Access (TDMA), Frequency Division Multiple Address (FDMA) and Code Division Multiple Access (CDMA), users at different locations within a same area may use a same time-frequency resource block to perform uplink access and data transmission.

In the existing technology, before sending an uplink data signal to a base station, a terminal first needs to initialize the uplink access, to keep the terminal and the base station synchronized. Then, the terminal sends an uplink resource request message to the base station. After receiving the uplink resource request message, the base station generates an uplink resource allocation message, and sends the uplink resource allocation message to the terminal. After receiving the uplink resource allocation message from the base station, the terminal generates an uplink data signal and a pilot signal. The terminal sends, on an uplink resource block allocated by the base station, the uplink data signal. In other words, regardless of a volume of uplink service data, the terminal needs to interact with the base station to generate an uplink data signal and a pilot signal. However, with the emergence of real-time online services and machine-type communications (MTC) services, a communication between a terminal and a base station tends to be short and a volume of uplink service data tends to be small. In this case, before the uplink service data is transmitted, resources occupied in the foregoing interaction between the terminal and the base station may be more than resources occupied for transmitting the uplink service data. Therefore, when a volume of the uplink service data sent from the terminal to the base station is relatively small, resources are wasted on the multiple interactions between the terminal and the base station for generating an uplink data signal and a pilot signal.

SUMMARY

Embodiments of the present application provide an uplink access method, apparatus, and system, to resolve a problem of a waste of resources that occurs because when a volume of uplink service data from a terminal to a base station is relatively small, the terminal needs to interact with the base station to generate an uplink data signal and a pilot signal.

To achieve the foregoing objective, the embodiments of the present application use the following technical solutions:

According to a first aspect, an uplink access method is provided, where the method includes:

obtaining uplink service data;

obtaining a first codebook from a preset codebook set;

obtaining, according to the first codebook and a mapping relationship between a codebook and a pilot sequence, a first pilot sequence corresponding to the first codebook;

generating an uplink data signal according to the first codebook and the uplink service data;

generating a pilot signal corresponding to the first pilot sequence; and sending the uplink data signal and the pilot signal to a base station.

With reference to the first aspect, in a first possible implementation manner, the obtaining a first codebook from a preset codebook set includes:

obtaining the first codebook from the preset codebook set when it is determined that a volume of the uplink service data is less than a preset data volume threshold.

With reference to the first aspect, in a second possible implementation manner, the generating an uplink data signal according to the first codebook and the uplink service data includes:

mapping the uplink service data into one or more data modulation symbols according to the first codebook; and generating the uplink data signal according to the data modulation symbols.

With reference to the first aspect, in a third possible implementation manner, the mapping relationship between a codebook and a pilot sequence is a mapping relationship between a codebook and a pilot sequence subset, where:

each codebook corresponds to one pilot sequence subset, each pilot sequence subset includes at least one pilot sequence, and no same pilot sequence exists in two pilot sequence subsets corresponding to any two codebooks.

With reference to the first aspect and the first to the third possible implementation manners, in a fourth possible implementation manner, before the obtaining uplink service data, the method further includes:

sending random access information to the base station, where the random access information includes uplink clock information of the terminal, so that the base station generates uplink clock adjustment information according to the uplink clock information;

receiving the uplink clock adjustment information from the base station; and adjusting clock information of the terminal according to the uplink clock adjustment information.

According to a second aspect, an uplink access method is provided, where the method includes:

receiving an uplink data signal and a pilot signal that are from a terminal, where:

the pilot signal is generated by the terminal according to a first pilot sequence, where the first pilot sequence is a pilot sequence corresponding to a first codebook that is obtained by the terminal according to the first codebook obtained from a preset codebook set and according to a mapping relationship between a codebook and a pilot sequence; and the uplink data signal is generated by the terminal according to the first codebook and uplink service data obtained by the terminal.

With reference to the second aspect, in a first possible implementation manner, the first codebook obtained by the terminal from the preset codebook set is obtained from the preset codebook set when a volume of the uplink service data is less than a preset data volume threshold.

With reference to the second aspect, in a second possible implementation manner, the mapping relationship between a codebook and a pilot sequence is a mapping relationship between a codebook and a pilot sequence subset, where:

each codebook corresponds to one pilot sequence subset, each pilot sequence subset includes at least one pilot sequence, and no same pilot sequence exists in two pilot sequence subsets corresponding to any two codebooks.

With reference to the second aspect and the first to the second possible implementation manners, in a third possible implementation manner, before the receiving an uplink data signal and a pilot signal that are from a terminal, the method further includes:

receiving random access information from the terminal, where the random access information includes uplink clock information of the terminal;

generating uplink clock adjustment information according to the uplink clock information; and sending the uplink clock adjustment information to the terminal, so that the terminal adjusts clock information of the terminal according to the uplink clock adjustment information.

According to a third aspect, a terminal is provided, where the terminal includes:

a first obtaining unit, configured to obtain uplink service data;

a second obtaining unit, configured to obtain a first codebook from a preset codebook set;

a third obtaining unit, configured to obtain, according to the first codebook and a mapping relationship between a codebook and a pilot sequence, a first pilot sequence corresponding to the first codebook;

a first generating unit, configured to generate an uplink data signal according to the first codebook and the uplink service data;

a second generating unit, configured to generate a pilot signal corresponding to the first pilot sequence; and a first sending unit, configured to send the uplink data signal and the pilot signal to a base station.

With reference to the third aspect, in a first possible implementation manner, the second obtaining unit is specifically configured to:

obtain the first codebook from the preset codebook set when it is determined that a volume of the uplink service data is less than a preset data volume threshold.

With reference to the third aspect, in a second possible implementation manner, the first generating unit is specifically configured to:

map the uplink service data into one or more data modulation symbols according to the first codebook; and generate the uplink data signal according to the data modulation symbols.

With reference to the third aspect, in a third possible implementation manner, the mapping relationship between a codebook and a pilot sequence is a mapping relationship between a codebook and a pilot sequence subset, where:

each codebook corresponds to one pilot sequence subset, each pilot sequence subset includes at least one pilot sequence, and no same pilot sequence exists in two pilot sequence subsets corresponding to any two codebooks.

With reference to the third aspect and the first to the third possible implementation manners, in a fourth possible implementation manner, the terminal further includes:

a second sending unit, configured to send random access information to the base station, where the random access information includes uplink clock information of the terminal, so that the base station generates uplink clock adjustment information according to the uplink clock information;

a receiving unit, configured to receive the uplink clock adjustment information from the base station; and an adjusting unit, configured to adjust clock information of the terminal according to the uplink clock adjustment information.

According to a fourth aspect, a base station is provided, where the base station includes:

a first receiving unit, configured to receive an uplink data signal and a pilot signal that are from a terminal, where:

the pilot signal is generated by the terminal according to a first pilot sequence, where the first pilot sequence is a pilot sequence corresponding to a first codebook that is obtained by the terminal according to the first codebook obtained from a preset codebook set and according to a mapping relationship between a codebook and a pilot sequence; and the uplink data signal is generated by the terminal according to the first codebook and uplink service data obtained by the terminal.

With reference to the fourth aspect, in a first possible implementation manner, the first codebook obtained by the terminal from the preset codebook set is obtained from the preset codebook set when a volume of the uplink service data is less than a preset data volume threshold.

With reference to the fourth aspect, in a second possible implementation manner, the mapping relationship between a codebook and a pilot sequence is a mapping relationship between a codebook and a pilot sequence subset, where:

each codebook corresponds to one pilot sequence subset, each pilot sequence subset includes at least one pilot sequence, and no same pilot sequence exists in two pilot sequence subsets corresponding to any two codebooks.

With reference to the fourth aspect and the first to the second possible implementation manners, in a third possible implementation manner, the base station further includes:

a second receiving unit, configured to receive random access information from the terminal, where the random access information includes uplink clock information of the terminal;

a generating unit, configured to generate uplink clock adjustment information according to the uplink clock information; and a sending unit, configured to send the uplink clock adjustment information to the terminal, so that the terminal adjusts clock information of the terminal according to the uplink clock adjustment information.

According to a fifth aspect, an uplink access system is provided, where the system includes:

at least one terminal described above and at least one base station described above.

According to a sixth aspect, a terminal is provided, where the terminal includes:

a processor, configured to obtain uplink service data, where:

the processor is further configured to obtain a first codebook from a preset codebook set;

the processor is further configured to obtain, according to the first codebook and a mapping relationship between a codebook and a pilot sequence, a first pilot sequence corresponding to the first codebook;

the processor is further configured to generate an uplink data signal according to the first codebook and the uplink service data; and the processor is further configured to generate a pilot signal corresponding to the first pilot sequence; and a transmitter, configured to send the uplink data signal and the pilot signal to a base station.

With reference to the sixth aspect, in a first possible implementation manner, the processor is specifically configured to:

obtain the first codebook from the preset codebook set when it is determined that a volume of the uplink service data is less than a preset data volume threshold.

With reference to the sixth aspect, in a second possible implementation manner, the processor is specifically configured to:

map the uplink service data into one or more data modulation symbols according to the first codebook; and generate the uplink data signal according to the data modulation symbols.

With reference to the sixth aspect, in a third possible implementation manner, the mapping relationship between a codebook and a pilot sequence is a mapping relationship between a codebook and a pilot sequence subset, where:

each codebook corresponds to one pilot sequence subset, each pilot sequence subset includes at least one pilot sequence, and no same pilot sequence exists in two pilot sequence subsets corresponding to any two codebooks.

With reference to the sixth aspect and the first to the third possible implementation manners, in a fourth possible implementation manner, the transmitter is further configured to send random access information to the base station, where the random access information includes uplink clock information of the terminal, so that the base station generates uplink clock adjustment information according to the uplink clock information; and the terminal further includes:

a receiver, configured to receive the uplink clock adjustment information from the base station; and the processor is further configured to adjust clock information of the terminal according to the uplink clock adjustment information.

According to a seventh aspect, a base station is provided, where the base station includes:

a receiver, configured to receive an uplink data signal and a pilot signal that are from a terminal, where:

the pilot signal is generated by the terminal according to a first pilot sequence, where the first pilot sequence is a pilot sequence corresponding to a first codebook that is obtained by the terminal according to the first codebook obtained from a preset codebook set and according to a mapping relationship between a codebook and a pilot sequence; and the uplink data signal is generated by the terminal according to the first codebook and uplink service data obtained by the terminal.

With reference to the seventh aspect, in a first possible implementation manner, the first codebook obtained by the terminal from the preset codebook set is obtained from the preset codebook set when a volume of the uplink service data is less than a preset data volume threshold.

With reference to the seventh aspect, in a second possible implementation manner, the mapping relationship between a codebook and a pilot sequence is a mapping relationship between a codebook and a pilot sequence subset, where:

each codebook corresponds to one pilot sequence subset, each pilot sequence subset includes at least one pilot sequence, and no same pilot sequence exists in two pilot sequence subsets corresponding to any two codebooks.

With reference to the seventh aspect and the first to the second possible implementation manners, in a third possible implementation manner, the receiver is further configured to receive random access information from the terminal, where the random access information includes uplink clock information of the terminal; and the base station further includes:

a processor, configured to generate uplink clock adjustment information according to the uplink clock information; and a transmitter, configured to send the uplink clock adjustment information to the terminal, so that the terminal adjusts clock information of the terminal according to the uplink clock adjustment information.

According to an eighth aspect, an uplink access system is provided, where the system includes:

at least one terminal described above and at least one base station described above.

According to the uplink access method, apparatus, and system provided in the embodiments of the present application, a terminal directly obtains a first codebook from a preset codebook set of the terminal. The terminal obtains, according to the first codebook and a mapping relationship between a codebook and a pilot sequence, a first pilot sequence corresponding to the first codebook, and generates an uplink data signal and a pilot signal. Before sending the uplink data signal and the pilot signal to a base station, the terminal does not need to interact with the base station to generate the uplink data signal and the pilot signal. This saves an information exchange process between the terminal and the base station, and particularly, effectively resolves a problem of a waste of resources that occurs because when a volume of uplink service data is relatively small, the terminal needs to interact with the base station to generate the uplink data signal and the pilot signal.

DESCRIPTION OF EMBODIMENTS

The following describes the technical solutions in the embodiments of the present application with reference to the accompanying drawings. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
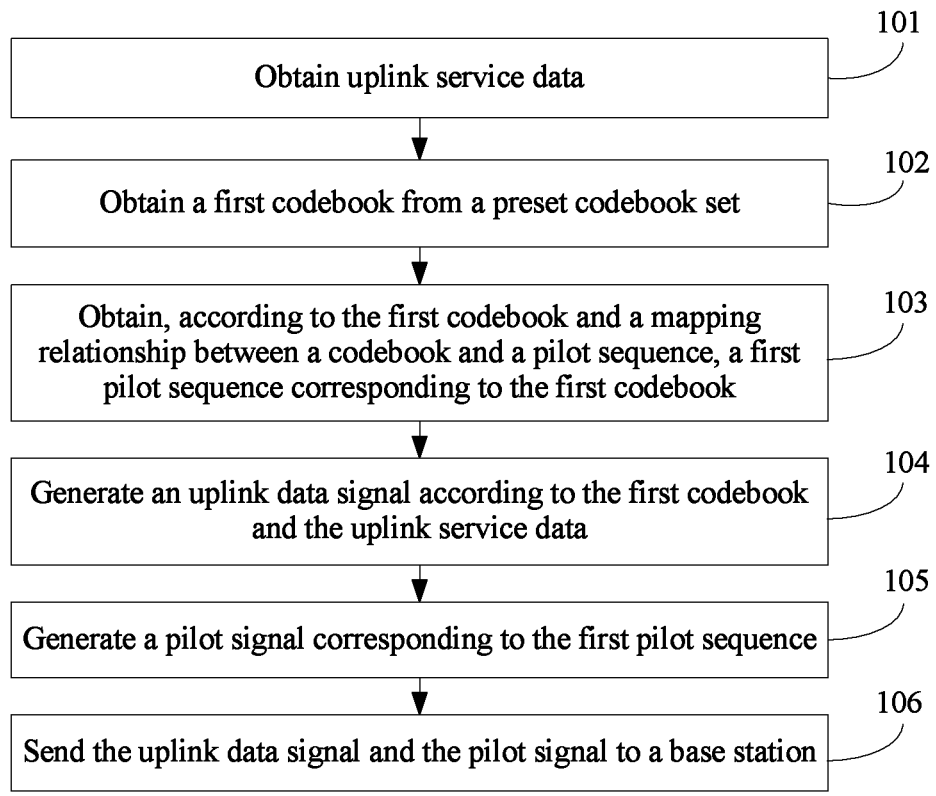
FIG. 1 is a flowchart of an uplink access method according to an embodiment of the present application.

An embodiment of the present application provides an uplink access method, which is performed by a terminal. As shown in FIG. 1, the method includes:

Step 101: The terminal obtains uplink service data.

An uplink service may be a voice service or a data service, and then the terminal may obtain uplink voice service data or uplink data service data.

It should be noted that before obtaining the uplink service data, the terminal first sends random access information to a base station. The random access information may include uplink clock information of the terminal, so that the base station generates uplink clock adjustment information according to the uplink clock information. The terminal receives the uplink clock adjustment information from the base station, and adjusts clock information of the terminal according to the uplink clock adjustment information.

Step 102: The terminal obtains a first codebook from a preset codebook set.

When it is determined that a volume of the uplink service data is less than a preset data volume threshold, the terminal obtains a first codebook from a preset codebook set of the terminal. It should be noted that the first codebook may be a codebook that is randomly selected from the preset codebook set. In addition, the preset codebook set of the terminal is the same as a preset codebook set of the base station. When the uplink service is a voice service, the uplink service data is uplink voice service data, and the preset data volume threshold is a data volume threshold that is preset in the terminal and that corresponds to maximum uplink service data of the voice service. When the uplink service is a data service, the uplink service data is uplink data service data, and the preset data volume threshold is a data volume threshold that is preset in the terminal and that corresponds to maximum uplink service data of the data service.

Step 103: The terminal obtains, according to the first codebook and a mapping relationship between a codebook and a pilot sequence, a first pilot sequence corresponding to the first codebook.

The mapping relationship between a codebook and a pilot sequence may be directly the mapping relationship between a codebook and a pilot sequence, or may be a mapping relationship between a codebook and a pilot sequence subset. When the mapping relationship is between a codebook and a pilot sequence subset, each codebook corresponds to one pilot sequence subset, each pilot sequence subset includes at least one pilot sequence, and no same pilot sequence exists in two pilot sequence subsets that correspond to any two codebooks.

Step 104: The terminal generates an uplink data signal according to the first codebook and the uplink service data.

The terminal maps the uplink service data into one or more data modulation symbols according to the first codebook, multiplies the data modulation symbols by a carrier signal to generate an uplink data signal, and transforms the uplink data signal into a high frequency signal for radio frequency transmission.

Step 105: The terminal generates a pilot signal corresponding to the first pilot sequence.

The first pilot sequence is modulated to generate a pilot signal. The modulation is a process in which information from a signal source is processed and added to a carrier, so that the information from the signal source is changed into a form suitable for channel transmission. In other words, the modulation is a technique that enables a carrier to vary with a signal.

Step 106: The terminal transmits the uplink data signal and the pilot signal to the base station.

After generating the uplink data signal according to the first codebook and the uplink service data, and generating the pilot signal corresponding to the first pilot sequence, the terminal sends, at a location of an uplink data resource block, the uplink data signal to the base station. The pilot signal may be inserted into the location of the uplink data resource block and sent to the base station together with the uplink data signal.

In this way, a terminal directly obtains a first codebook from a preset codebook set of the terminal, obtains, according to the first codebook and a mapping relationship between a codebook and a pilot sequence, a first pilot sequence corresponding to the first codebook, and generates an uplink data signal and a pilot signal. Before sending the uplink data signal and the pilot signal to a base station, the terminal does not need to interact with the base station to generate the uplink data signal and the pilot signal. This saves an information exchange process between the terminal and the base station, and particularly, effectively reduces a waste of resources that occurs when a volume of uplink service data is relatively small, but the terminal still needs to interact with the base station to generate the uplink data signal and the pilot signal.

Corresponding to the foregoing process, the base station receives the uplink data and the pilot signal from the terminal.

It should be noted that before receiving the uplink data signal and the pilot signal from the terminal, the base station received random access information from the terminal. The random access information includes uplink clock information of the terminal. The base station generates uplink clock adjustment information according to the uplink clock information. The uplink clock adjustment information is sent to the terminal, so that the terminal adjusts clock information of the terminal according to the uplink clock adjustment information.

Figure 2:
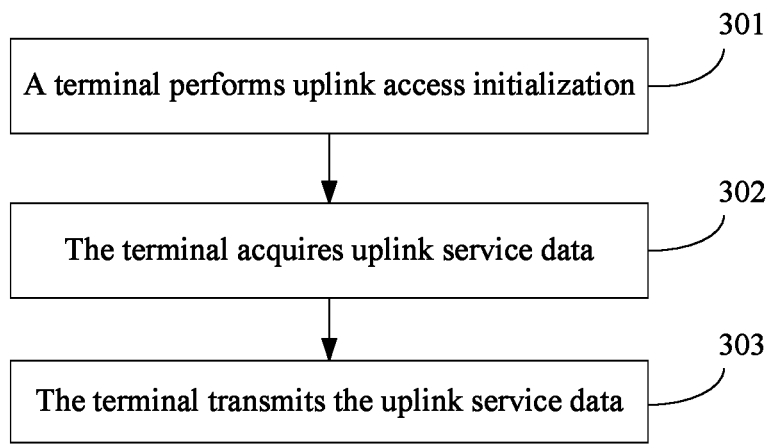
FIG. 2 is a flowchart of another uplink access method according to an embodiment of the present application.
Figure 3:
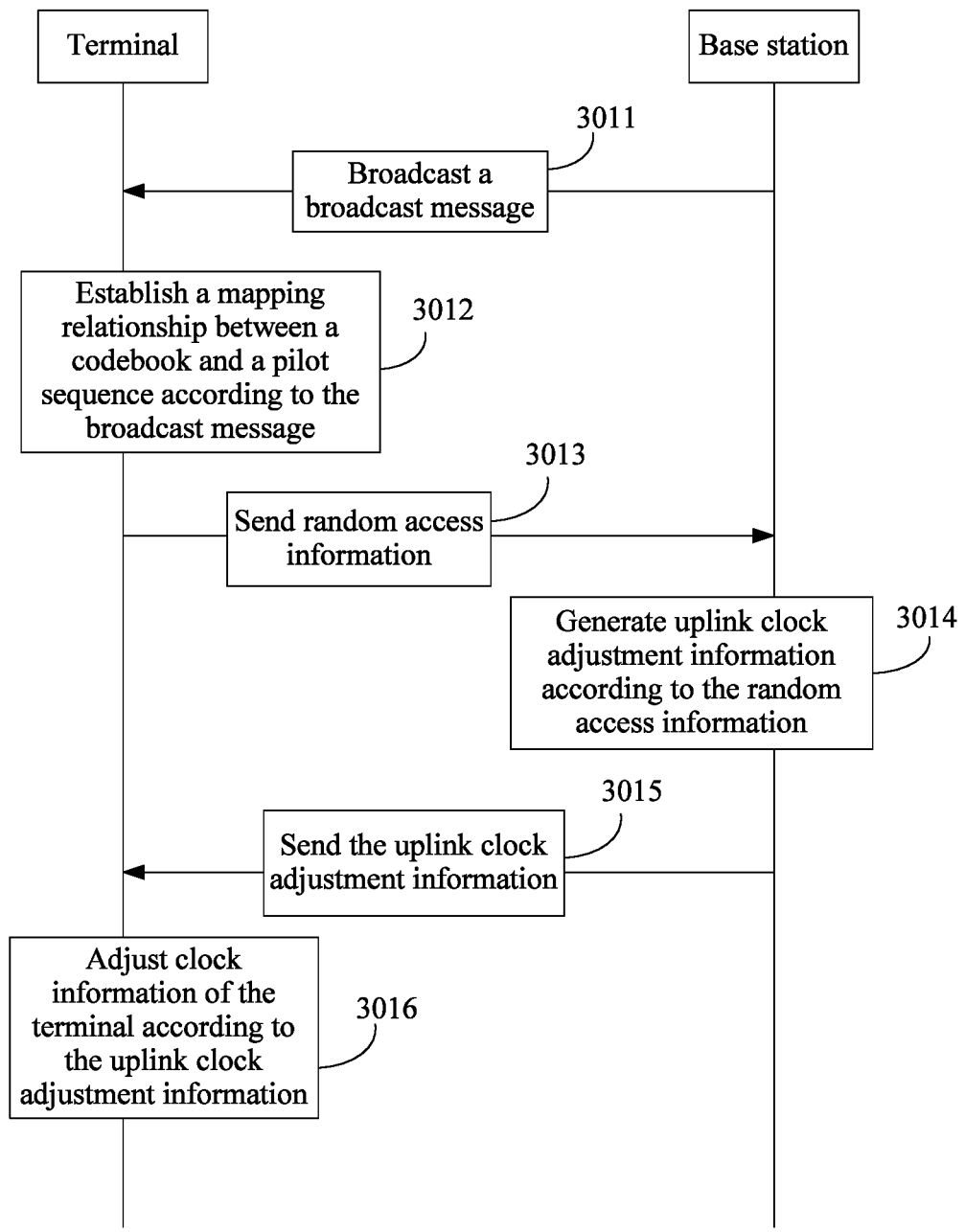
FIG. 3 is a flowchart of still another uplink access method according to an embodiment of the present application.
Figure 4:
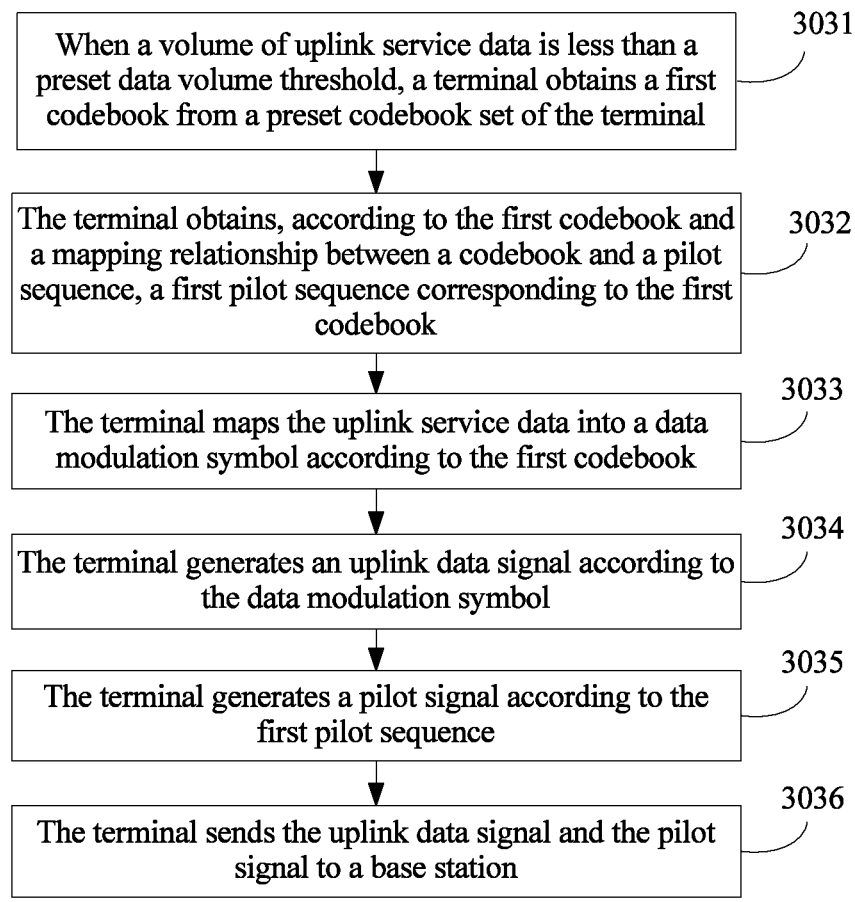
FIG. 4 is a flowchart of yet another uplink access method according to an embodiment of the present application.

An embodiment of the present application provides an uplink access method in a system including a terminal and a base station is shown in FIG. 2 and further in FIGS. 3 and 4. The method includes the following steps:

Step 301: The terminal performs uplink access initialization.

As shown in FIG. 3, step 301 specifically includes the following steps:

Step 3011: The base station broadcasts a broadcast message to the terminal.

Before sending an uplink data signal to the base station, the terminal first needs to perform an uplink access initialization. Specifically, the terminal receives a broadcast message from the base station. The broadcast message includes information such as a cell address of a cell used when the terminal performs cell camping and uplink service communication, a root sequence number, a time-frequency resource used when the terminal transmits an uplink data signal, a location of an uplink data resource block, and a location of a random access resource block.

Step 3012: The terminal establishes a mapping relationship between a codebook and a pilot sequence according to the broadcast message.

After receiving the broadcast message from the base station, the terminal generates, according to the cell address, the root sequence number, and so on in the broadcast message, one or more pilot sequences, to form a pilot sequence subset. The terminal may group, according to a resource element location of a time-frequency resource occupied by the pilot sequences and a cyclic shift parameter, the one or more pilot sequences to form the pilot sequence subset. A mapping relationship between a codebook in a preset codebook set of the terminal and a pilot sequence is formed. The mapping relationship between a codebook and a pilot sequence may also be a mapping relationship between a codebook and a pilot sequence subset, where each codebook corresponds to one pilot sequence subset, each pilot sequence subset includes at least one pilot sequence, and no same pilot sequence exists in two pilot sequence subsets that correspond to any two codebooks.

Step 3013: The terminal sends random access information to the base station.

After establishing the mapping relationship between a codebook and a pilot sequence, the terminal sends, at the location of the random access resource block allocated by the base station, the random access information to the base station, where the random access information includes uplink clock information of the terminal.

It should be noted that the uplink clock information is used to keep time synchronization between the terminal and the base station. The time alignment is required when uplink data signals obtained by modulating uplink service data of different terminals arrive at the base station, to ensure orthogonality of uplink data signals between base stations. This is helpful in eliminating intra-cell interference. However, a delay exists when an uplink data signal is being transmitted spatially. If a terminal moves away from a base station during a call, downlink data signals from the base station to the terminal will arrive at the terminal increasingly later. In addition, uplink data signals of the terminal will also arrive at the base station increasingly later. If the uplink data signals or the downlink data signals are excessively delayed, an uplink data signal of the terminal in a current timeslot that is received by the base station and an uplink data signal of a next terminal that is received by the base station are overlapped, causing inter-symbol interferences. Therefore, the terminal needs to send uplink clock information to the base station, and adjusts an uplink clock of the terminal according to uplink clock adjustment information sent from the base station to the terminal, to keep synchronization between the terminal and the base station when the terminal sends uplink data.

Step 3014: The base station generates uplink clock adjustment information according to the random access information.

After receiving the random access information at the location of the random access resource block, where the location corresponds to the terminal, the base station generates the uplink clock adjustment information according to the random access information, where the random access information includes the uplink clock information of the terminal.

Step 3015: The base station sends the uplink clock adjustment information to the terminal.

Step 3016: The terminal adjusts clock information of the terminal according to the uplink clock adjustment information.

The terminal receives, at the location of the random access resource block allocated by the base station, the uplink clock adjustment information, and adjusts, according to the uplink clock adjustment information, a clock of the terminal to establish synchronization with the base station, so that an uplink data signal is transmitted between the terminal and the base station.

Step 302: The terminal obtains uplink service data.

A user may engage a voice service or a data service by operating the terminal. For an example, the user may trigger a keyboard displayed in a user interface of the terminal, enter information of a caller user, and trigger a dial key. The terminal receives the trigger signal, obtains uplink voice service data, and sends a call request to the base station. For another example, the user may surf the Internet to browse a web page by using the terminal, and then the terminal obtains uplink data service data and sends a data request to the base station.

Step 303: The terminal transmits the uplink service data.

When a volume of the uplink service data is less than a preset data volume threshold, the terminal obtains a first codebook from a preset codebook set of the terminal. The terminal obtains, according to the first codebook and a mapping relationship between a codebook and a pilot sequence, a first pilot sequence corresponding to the first codebook. The terminal generates an uplink data signal and a pilot signal, and sends the uplink data signal and the pilot signal to the base station. An uplink service may be a voice service or a data voice. When the uplink service is a voice service, the uplink service data is uplink voice service data, and the preset data volume threshold is a data volume threshold that is preset in the terminal and that corresponds to maximum uplink service data of the voice service. When the uplink service is a data service, the uplink service data is uplink data service data, and the preset data volume threshold is a data volume threshold that is preset in the terminal and that corresponds to maximum uplink service data of the data service.

As shown in FIG. 4, step 303 specifically includes the following steps:

Step 3031: When a volume of the uplink service data is less than a preset data volume threshold, the terminal obtains a first codebook from a preset codebook set of the terminal.

The terminal may randomly select and obtain the first codebook from the preset codebook set, where the preset codebook set is the same as a preset codebook set of the base station. A codebook in the codebook set may be numbered by using $\log_2^K$ bits, where K is a quantity of existing terminals, and K is an integer greater than or equal to 1.

Step 3032: The terminal obtains, according to the first codebook and a mapping relationship between a codebook and a pilot sequence, a first pilot sequence corresponding to the first codebook.

The mapping relationship between a codebook and a pilot sequence may be directly the mapping relationship between a codebook and a pilot sequence, or may be a mapping relationship between a codebook and a pilot sequence subset. Each codebook corresponds to one pilot sequence subset, each pilot sequence subset includes at least one pilot sequence, and no same pilot sequence exists in two pilot sequence subsets corresponding to any two codebooks. Specifically, the preset codebook set of the terminal includes at least one codebook, where each codebook corresponds to one pilot sequence subset, each pilot sequence subset includes at least one pilot sequence, no same pilot sequence exists in two pilot sequence subsets corresponding to any two codebooks, and two different pilot sequences are orthogonal to each other. The terminal obtains, according to the first codebook and the mapping relationship between a codebook and a pilot sequence, the first pilot sequence corresponding to the first codebook. A pilot sequence in the pilot sequence subset may be encoded by using $\log_2^M$ bits, where M is a quantity of pilot sequences in a pilot sequence subset corresponding to each codebook in the codebook set, and M is an integer greater than or equal to 1.

Step 3033: The terminal maps the uplink service data into one or more data modulation symbols according to the first codebook.

The terminal maps the uplink service data to be sent to the base station into the one or more data modulation symbols by using the first codebook that is randomly selected and according to a modulation scheme. The modulation scheme may be Quadrature Amplitude Modulation (QAM) or the like. A data modulation symbol corresponds to an amplitude and a phase of in a baseband signal, where the baseband signal is an original electrical signal that is from the terminal and that is not modulated. In other words, the original electrical signal is a signal on which modulation such as spectrum shifting and conversion is not performed and that directly expresses to-be-transmitted information. For example, a sound wave generated during speaking is a baseband signal.

It is assumed that the first codebook is an SCMA codebook. The SCMA is a hybrid multiple access mode, and the uplink service data to be sent from the terminal to the base station is mapped into one or more data modulation symbols by using the SCMA codebook. That is, according to a combination of the QAM modulation technology and a CDMA technology, multiple pieces of uplink service data use a same time-frequency resource block, where each time-frequency resource block consists of several resource elements. Specifically, first an available time-frequency resource is divided into several orthogonal time-frequency resource blocks, where each time-frequency resource block includes L resource elements. It is assumed that there are K terminals, and when the K terminals send uplink service data to the base station, the uplink service data is divided into data blocks with a size of S bits each, and each data block is mapped into a group of data modulation symbols $X_K = \{X_{K1}, X_{K2}, \ldots X_{KL}\}$ by searching an SCMA codebook $C_k$. Each data modulation symbol corresponds to one resource element in a time-frequency resource block. K is an integer greater than or equal to 1, L is an integer greater than or equal to 1, and X is an integer greater than or equal to 1.

It should be noted that different SCMA codebooks are distinguished from each other according to different locations of a symbol 0. For a data block with a size of S bits, each SCMA codebook includes $2^S$ different modulation symbol groups that correspond to $2^S$ possible data blocks. Each modulation symbol group has some symbols that are 0, and resource element locations at which symbols 0 in different modulation symbol groups of a same SCMA codebook are the same. In addition, the SCMA codebook meets a sparsity condition, that is, a quantity of resource elements occupied by symbols 0 in a modulation symbol group is greater than or equal to a half of the total quantity of resource elements.

For example, if the uplink service data of the terminal is divided into data blocks with a size of 2 bits each, a length of a modulation symbol group is 4, a group of data blocks is mapped into one data modulation symbol by using QAM modulation. For example, 2-bit data is mapped into a data modulation symbol with four constellation points by using 4QAM, 00 is mapped into 1+i, 01 is mapped into 1−i, 10 is mapped into −1+i, 11 is mapped into −1−i. Further, one data modulation symbol is extended to multiple data modulation symbols according to the CDMA technology. For example, a modulation symbol 1+i is extended to four modulation symbols by using a spreading code 1001, that is, 1+i, −1−i, −1−i, and 1+i. It should be noted that the SCMA codebook corresponds to the modulation symbol group, and maps a data block into multiple data modulation symbols. In addition, the SCMA codebook is not a simple extension of a same data modulation symbol, but a group of predetermined symbols, and locations of some symbols of the SCMA codebook are 0. Different uplink service data uses different codebooks to map a same data block into different modulation symbol groups.

Step 3034: The terminal generates an uplink data signal according to the data modulation symbols.

The terminal maps, by using the first codebook that is randomly selected and according to the modulation technology, the uplink service data into the data modulation symbols, where a data modulation symbol corresponds to an amplitude and a phase of the baseband signal. Because a frequency of the baseband signal is relatively low, after the terminal obtains the uplink service data and before the terminal sends the uplink service data to the base station, a signal that is not modulated is a baseband signal in the present application. Then, the baseband signal is transformed into a high frequency signal by multiplying a carrier signal, to generate an uplink data signal used for radio frequency sending. A carrier refers to a waveform that is modulated to transmit a signal, and generally is a sine wave. The carrier signal is used to modulate a common signal to a high frequency signal with a specific frequency. When no common signal is loaded, an amplitude of a high frequency signal is fixed, and after a common signal is loaded, the amplitude of the high frequency signal varies with the common signal, that is, the amplitude is modulated. A phase, a frequency, and the like of the high frequency signal may also be modulated. The common signal is a voice signal, an image signal, or the like.

Step 3035: The terminal generates a pilot signal according to the first pilot sequence.

The terminal generates, according to the first pilot sequence that corresponds to the first codebook and that is obtained in step 3032, the pilot signal corresponding to the first pilot sequence.

Step 3036: The terminal sends the uplink data signal and the pilot signal to the base station.

The terminal generates the uplink data signal according to the first codebook and the uplink service data. The terminal generates the pilot signal corresponding to the first pilot sequence. The terminal sends, at a location of a first access resource block, the uplink data signal and the pilot signal to the base station, so that the base station obtains the uplink service data according to the uplink data signal and the pilot signal.

After receiving the uplink data signal and the pilot signal that are from the terminal, the base station may perform channel estimation and decoding to obtain the uplink service data of the terminal. Specific processes of channel estimation and decoding are not described herein.

When the terminal determines that a volume of the uplink service data is greater than or equal to a preset data volume threshold, the uplink access mode of the terminal is consistent with an existing mode. What is different is that the terminal first sends an uplink resource request message to the base station. After receiving the uplink resource request message, the base station obtains a second codebook from a preset codebook set of the base station. The base station obtains, according to the second codebook and a mapping relationship between a codebook and a pilot sequence, a second pilot sequence corresponding to the second codebook. The base station sends a sequence number of the second codebook and a sequence number of the second pilot sequence to the terminal. The terminal obtains, according to the sequence number of the second codebook, the second codebook from a preset codebook set of the terminal. The terminal obtains, according to the sequence number of the second pilot sequence, the second pilot sequence corresponding to the second codebook. Finally, according to the second codebook and the second pilot sequence, the terminal generates a second uplink data signal and a second pilot signal, and sends the second uplink data signal and the second pilot signal to the base station. The preset codebook set of the base station is the same as the preset codebook set of the terminal, and a pilot sequence subset preset in the base station is the same as a pilot sequence subset preset in the terminal.

It should be noted that a sequence of steps of the uplink access method provided in this embodiment of the present application may be properly adjusted, and the steps may also be increased or decreased according to a situation. For example, a sequence between step 3034 and step 3035 may be interchanged. That is, a pilot signal may be first generated and then an uplink data signal is generated. Alternatively, when the volume of the uplink service data is greater than or equal to the preset data volume threshold, before sending the second uplink data signal and the second pilot signal to the base station, the terminal may first generate the second pilot signal and then generate the second uplink data signal. Any variation method readily figured out by a person skilled in the art within the technical scope disclosed in the present application shall fall within the protection scope of the present application, and details are not described herein.

According to the uplink access method provided in this embodiment of the present application, after a terminal obtains uplink service data, when the terminal determines that a volume of the uplink service data is less than a preset data volume threshold, the terminal obtains a first codebook from the preset codebook set. The terminal obtains, according to the first codebook and a mapping relationship between a codebook and a pilot sequence, a first pilot sequence corresponding to the first codebook. The terminal generates an uplink data signal according to the first codebook and the uplink service data, and generates a pilot signal corresponding to the first pilot sequence. The terminal sends the uplink data signal and the pilot signal to a base station. After receiving the uplink data signal and the pilot signal from the terminal, the base station may perform channel estimation and decoding to obtain the uplink service data of the terminal. Compared with that in the prior art, a terminal may directly obtain a first codebook from a preset codebook set of the terminal, obtain, according to the first codebook and a mapping relationship between a codebook and a pilot sequence, a first pilot sequence corresponding to the first codebook, and generate an uplink data signal and a pilot signal. Before sending the uplink data signal and the pilot signal to a base station, the terminal does not need to interact with the base station to generate the uplink data signal and the pilot signal. This saves an information exchange process between the terminal and the base station, and particularly, effectively resolves a problem of a waste of resources that occurs because when a volume of uplink service data is relatively small, the terminal needs to interact with the base station to generate the uplink data signal and the pilot signal.

Figure 5:
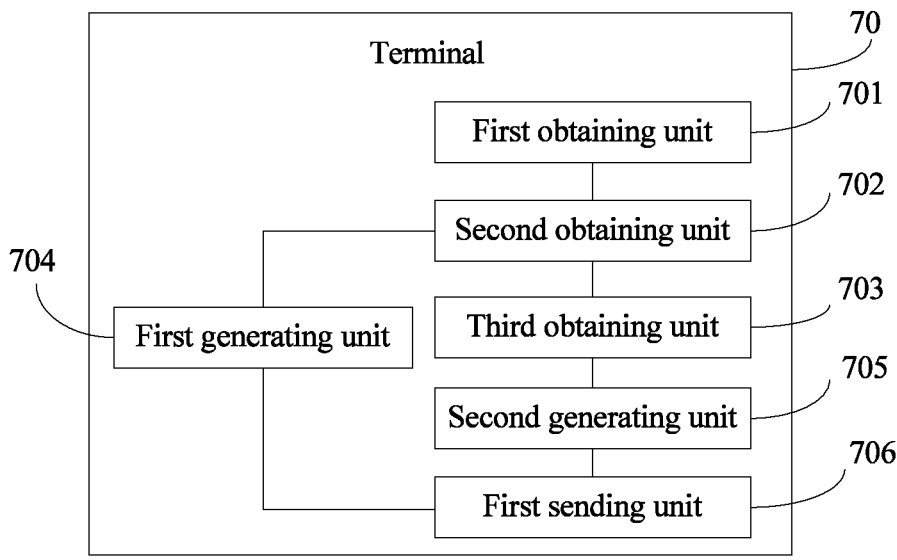
FIG. 5 is a functional diagram of a terminal according to an embodiment of the present application.

An embodiment of the present application provides a terminal 70. As shown in FIG. 5, the terminal 70 includes: a first obtaining unit 701, a second obtaining unit 702, a third obtaining unit 703, a first generating unit 704, a second generating unit 705, and a first sending unit 706.

The first obtaining unit 701 is configured to obtain uplink service data.

The uplink service may be a voice service or a data service, and then the terminal may obtain uplink voice service data or uplink data service data.

It should be noted that before obtaining the uplink service data, the terminal first sends random access information to a base station. The random access information may include uplink clock information of the terminal, so that the base station generates uplink clock adjustment information according to the uplink clock information. The terminal then receives the uplink clock adjustment information from the base station, and adjusts clock information of the terminal according to the uplink clock adjustment information.

The second obtaining unit 702 is configured to obtain a first codebook from a preset codebook set.

When determining that a volume of the uplink service data is less than a preset data volume threshold, the terminal obtains a first codebook from a preset codebook set. It should be noted that the first codebook is a codebook that is randomly selected by the terminal from the preset codebook set; in addition, the preset codebook set of the terminal is the same as a preset codebook set of the base station.

The third obtaining unit 703 is configured to obtain, according to the first codebook and a mapping relationship between a codebook and a pilot sequence, a first pilot sequence corresponding to the first codebook.

The first generating unit 704 is configured to generate an uplink data signal according to the first codebook and the uplink service data.

The terminal maps the uplink service data into one or more data modulation symbols according to the first codebook, multiplies the data modulation symbols by a carrier signal to generate the uplink data signal, and transforms the uplink data signal into a high frequency signal used for radio frequency sending.

The second generating unit 705 is configured to generate a pilot signal corresponding to the first pilot sequence.

The first pilot sequence is modulated to generate the pilot signal. The modulation is a process in which information from a signal source is processed and added to a carrier, so that the information from the signal source is changed to information in a form suitable for channel transmission, that is, the modulation is a technology that enables a carrier to vary with a signal. Generally, the pilot signal is a signal sent, with a purpose of measuring or monitoring, in a telecommunications network.

The first sending unit 706 is configured to send the uplink data signal and the pilot signal to the base station.

In this way, a terminal may directly obtain a first codebook from a preset codebook set of the terminal, obtain, according to the first codebook and a mapping relationship between a codebook and a pilot sequence, a first pilot sequence corresponding to the first codebook, and generate an uplink data signal and a pilot signal. Before sending the uplink data signal and the pilot signal to a base station, the terminal does not need to interact with the base station to generate the uplink data signal and the pilot signal. This saves an information exchange process between the terminal and the base station, and particularly, effectively resolves a problem of a waste of resources that occurs because when a volume of uplink service data is relatively small, the terminal needs to interact with the base station to generate the uplink data signal and the pilot signal.

The second obtaining unit 702 is specifically configured to:

obtain the first codebook from the preset codebook set when it is determined that a volume of the uplink service data is less than a preset data volume threshold.

The first generating unit 704 is specifically configured to:

map the uplink service data into one or more data modulation symbols according to the first codebook; and generate the uplink data signal according to the data modulation symbols.

The mapping relationship between a codebook and a pilot sequence is a mapping relationship between a codebook and a pilot sequence subset, where:

each codebook corresponds to one pilot sequence subset, each pilot sequence subset includes at least one pilot sequence, and no same pilot sequence exists in two pilot sequence subsets corresponding to any two codebooks.

Figure 6:
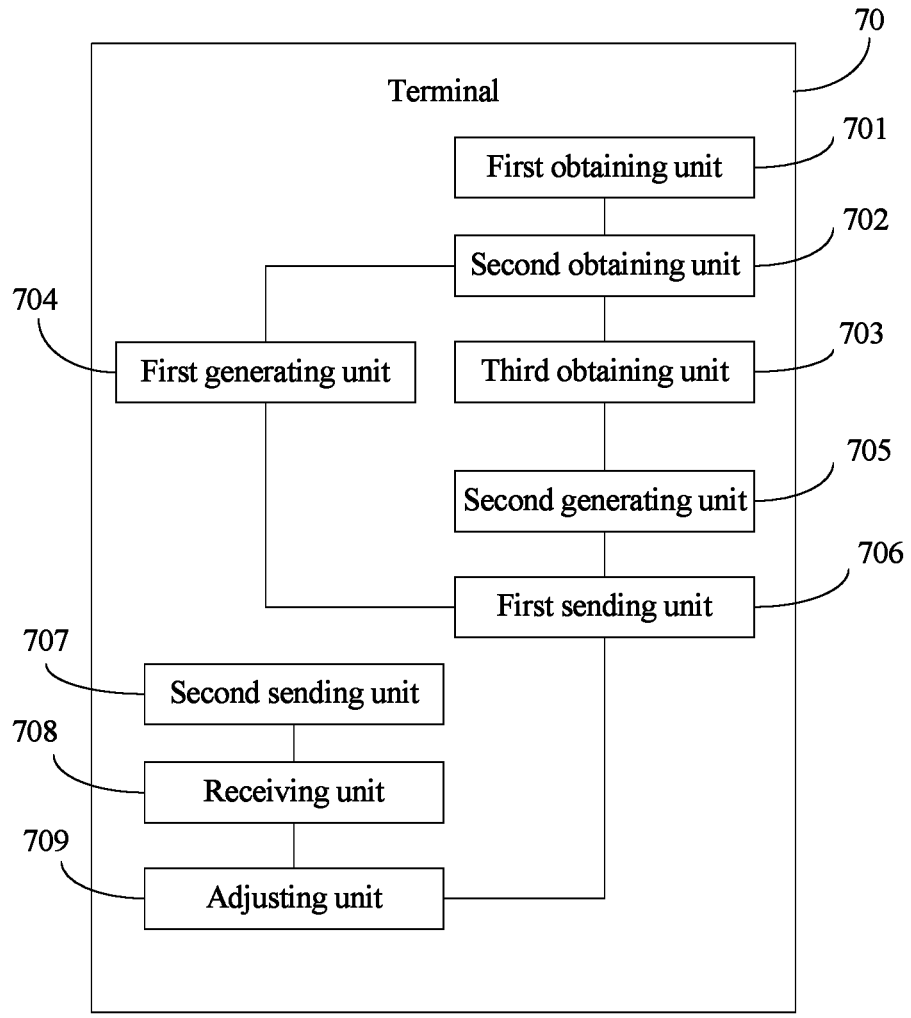
FIG. 6 is a functional diagram of another terminal according to an embodiment of the present application.

As shown in FIG. 6, the terminal 70 further includes:

a second sending unit 707, configured to send random access information to the base station, where the random access information includes uplink clock information of the terminal, so that the base station generates uplink clock adjustment information according to the uplink clock information;

a receiving unit 708, configured to receive the uplink clock adjustment information from the base station; and an adjusting unit 709, configured to adjust clock information of the terminal according to the uplink clock adjustment information.

Figure 7:
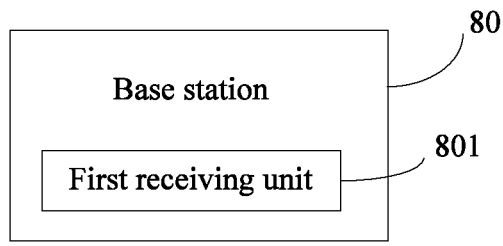
FIG. 7 is a functional diagram of a base station according to an embodiment of the present application.

An embodiment of the present application provides a base station 80. As shown in FIG. 7, the base station 80 includes:

a first receiving unit 801, configured to receive an uplink data signal and a pilot signal from a terminal.

The pilot signal is generated by the terminal according to a first pilot sequence. The first pilot sequence is a pilot sequence corresponding to a first codebook that is obtained by the terminal according to the first codebook obtained from a preset codebook set and according to a mapping relationship between a codebook and a pilot sequence. The uplink data signal is generated by the terminal according to the first codebook and uplink service data obtained by the terminal.

In this way, a base station receives an uplink data signal and a pilot signal from a terminal. The uplink data signal is generated by the terminal according to the first codebook and uplink service data obtained by the terminal. The pilot signal is generated by the terminal according to a first pilot sequence corresponding to the first codebook. Compared with that in the prior art, before the uplink data signal and the pilot signal that are from the terminal are received, the terminal does not need to interact with the base station to generate the uplink data signal and the pilot signal. This saves an information exchange process between the terminal and the base station, and particularly, effectively resolves a problem of a waste of resources that occurs because when a volume of the uplink service data is relatively small, the terminal needs to interact with the base station to generate the uplink data signal and the pilot signal.

The first codebook obtained by the terminal from the preset codebook set is obtained from the preset codebook set when a volume of the uplink service data is less than a preset data volume threshold.

The mapping relationship between a codebook and a pilot sequence is a mapping relationship between a codebook and a pilot sequence subset, where:

each codebook corresponds to one pilot sequence subset, each pilot sequence subset includes at least one pilot sequence, and no same pilot sequence exists in two pilot sequence subsets corresponding to any two codebooks.

Figure 8:
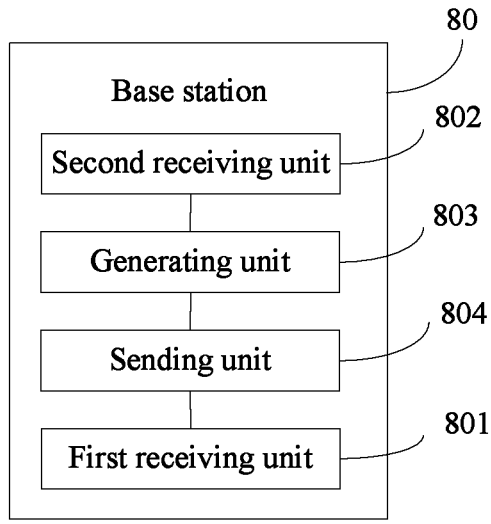
FIG. 8 is a functional diagram of another base station according to an embodiment of the present application.

As shown in FIG. 8, the base station 80 further includes:

a second receiving unit 802, configured to receive random access information from the terminal, where the random access information includes uplink clock information of the terminal;

a generating unit 803, configured to generate uplink clock adjustment information according to the uplink clock information; and a sending unit 804, configured to send the uplink clock adjustment information to the terminal, so that the terminal adjusts clock information of the terminal according to the uplink clock adjustment information.

Figure 9:
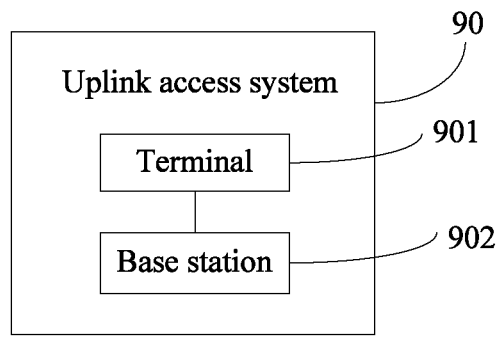
FIG. 9 is a simplified block diagram of an uplink access system according to an embodiment of the present application.

An embodiment of the present application provides an uplink access system 90. As shown in FIG. 9, the uplink access system 90 includes:

at least one terminal 901, where the terminal 901 is configured to:

obtain uplink service data; obtain a first codebook from a preset codebook set; obtain, according to the first codebook and a mapping relationship between a codebook and a pilot sequence, a first pilot sequence corresponding to the first codebook; generate an uplink data signal according to the first codebook and the uplink service data; generate a pilot signal corresponding to the first pilot sequence; and send the uplink data signal and the pilot signal to a base station 902; and at least one base station 902, where the base station 902 is configured to:

receive an uplink data signal and a pilot signal from a terminal 901, where:

the pilot signal is generated by the terminal according to a first pilot sequence, where the first pilot sequence is a pilot sequence corresponding to a first codebook that is obtained by the terminal according to the first codebook obtained from a preset codebook set and according to a mapping relationship between a codebook and a pilot sequence; and the uplink data signal is generated by the terminal according to the first codebook and uplink service data obtained by the terminal.

Figure 10:
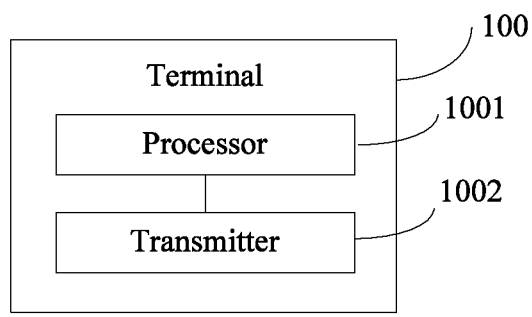
FIG. 10 is a simplified block diagram of still another terminal according to an embodiment of the present application.

An embodiment of the present application provides a terminal 100. As shown in FIG. 10, the terminal 100 includes a processor 1001 and a transmitter 1002.

The processor 1001 is configured to obtain uplink service data.

The uplink service may be a voice service or a data service, and then the terminal may obtain uplink voice service data or uplink data service data.

It should be noted that before obtaining the uplink service data, the terminal first sends random access information to a base station, where the random access information may include uplink clock information of the terminal, so that the base station generates uplink clock adjustment information according to the uplink clock information; and then receives the uplink clock adjustment information from the base station, and adjusts clock information of the terminal according to the uplink clock adjustment information.

The processor 1001 is further configured to obtain a first codebook from a preset codebook set.

When determining that a volume of the uplink service data is less than a preset data volume threshold, the terminal obtains a first codebook from a preset codebook set. It should be noted that the first codebook is a codebook that is randomly selected by the terminal from the preset codebook set; in addition, the preset codebook set of the terminal is the same as a preset codebook set of the base station.

The processor 1001 is further configured to obtain, according to the first codebook and a mapping relationship between a codebook and a pilot sequence, a first pilot sequence corresponding to the first codebook.

The processor 1001 is further configured to generate an uplink data signal according to the first codebook and the uplink service data.

The terminal maps the uplink service data into one or more data modulation symbols according to the first codebook, multiplies the data modulation symbols by a carrier signal to generate the uplink data signal, and transforms the uplink data signal into a high frequency signal used for radio frequency sending.

The processor 1001 is further configured to generate a pilot signal corresponding to the first pilot sequence.

The first pilot sequence is modulated to generate the pilot signal. The modulation is a process in which information from a signal source is processed and added to a carrier, so that the information from the signal source is changed to information in a form suitable for channel transmission, that is, the modulation is a technology that enables a carrier to vary with a signal. Generally, the pilot signal is a signal sent, with a purpose of measuring or monitoring, in a telecommunications network.

The transmitter 1002 is configured to send the uplink data signal and the pilot signal to the base station.

In this way, a terminal may directly obtain a first codebook from a preset codebook set of the terminal, obtain, according to the first codebook and a mapping relationship between a codebook and a pilot sequence, a first pilot sequence corresponding to the first codebook, and generate an uplink data signal and a pilot signal. Before sending the uplink data signal and the pilot signal to a base station, the terminal does not need to interact with the base station to generate the uplink data signal and the pilot signal. This saves an information exchange process between the terminal and the base station, and particularly, effectively resolves a problem of a waste of resources that occurs because when a volume of uplink service data is relatively small, the terminal needs to interact with the base station to generate the uplink data signal and the pilot signal.

The processor 1001 is specifically configured to:
obtain the first codebook from the preset codebook set when it is determined that a volume of the uplink service data is less than a preset data volume threshold.

The processor 1001 is specifically configured to:
map the uplink service data into one or more data modulation symbols according to the first codebook; and
generate the uplink data signal according to the data modulation symbols.

The mapping relationship between a codebook and a pilot sequence is a mapping relationship between a codebook and a pilot sequence subset, where:
each codebook corresponds to one pilot sequence subset, each pilot sequence subset includes at least one pilot sequence, and no same pilot sequence exists in two pilot sequence subsets corresponding to any two codebooks.

The transmitter 1002 is further configured to send random access information to the base station, where the random access information includes uplink clock information of the terminal, so that the base station generates uplink clock adjustment information according to the uplink clock information.

Figure 11:
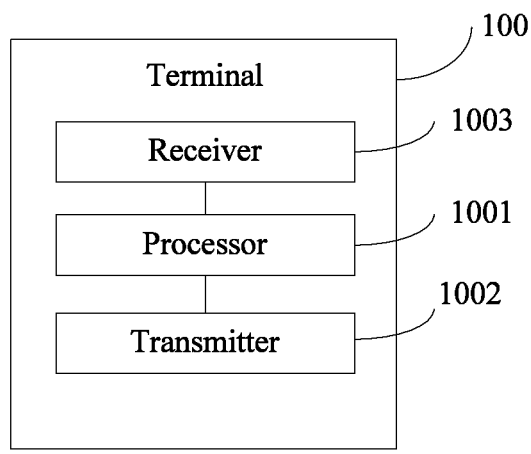
FIG. 11 is a simplified block diagram of yet another terminal according to an embodiment of the present application.

As shown in FIG. 11, the terminal 100 further includes:
a receiver 1003, configured to receive the uplink clock adjustment information from the base station.

The processor 1001 is further configured to adjust clock information of the terminal according to the uplink clock adjustment information.

Figure 12:
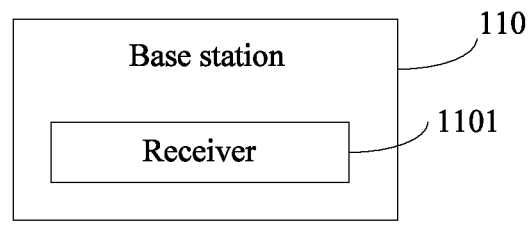
FIG. 12 is a simplified block diagram of still another base station according to an embodiment of the present application.

An embodiment of the present application provides a base station 110. As shown in FIG. 12, the base station 110 includes:
a receiver 1101, configured to receive an uplink data signal and a pilot signal that are from a terminal, where:
the pilot signal is generated by the terminal according to a first pilot sequence, where the first pilot sequence is a pilot sequence corresponding to a first codebook that is obtained by the terminal according to the first codebook obtained from a preset codebook set and according to a mapping relationship between a codebook and a pilot sequence; and
the uplink data signal is generated by the terminal according to the first codebook and uplink service data obtained by the terminal.

The first codebook obtained by the terminal from the preset codebook set is obtained from the preset codebook set when a volume of the uplink service data is less than a preset data volume threshold.

The mapping relationship between a codebook and a pilot sequence is a mapping relationship between a codebook and a pilot sequence subset, where:
each codebook corresponds to one pilot sequence subset, each pilot sequence subset includes at least one pilot sequence, and no same pilot sequence exists in two pilot sequence subsets corresponding to any two codebooks.

In this way, a base station receives an uplink data signal and a pilot signal from a terminal. The uplink data signal is generated by the terminal according to the first codebook and uplink service data obtained by the terminal. The pilot signal is generated by the terminal according to a first pilot sequence corresponding to the first codebook. Compared with that in the prior art, before the uplink data signal and the pilot signal that are from the terminal are received, the terminal does not need to interact with the base station to generate the uplink data signal and the pilot signal. This saves an information exchange process between the terminal and the base station, and particularly, effectively resolves a problem of a waste of resources that occurs because when a volume of the uplink service data is relatively small, the terminal needs to interact with the base station to generate the uplink data signal and the pilot signal.

The receiver 1101 is further configured to receive random access information from the terminal, where the random access information includes uplink clock information of the terminal.

Figure 13:
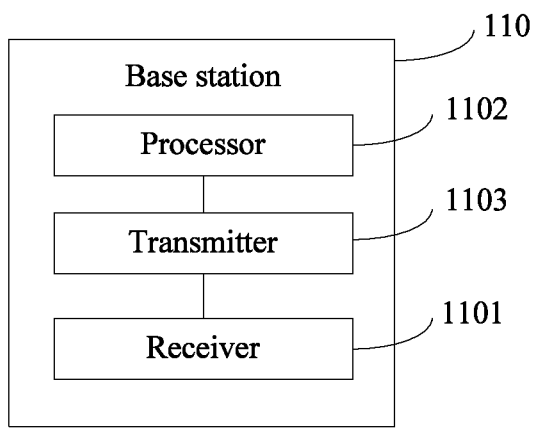
FIG. 13 is a simplified block diagram of yet another base station according to an embodiment of the present application.

As shown in FIG. 13, the base station 1101 further includes:
a processor 1102, configured to generate uplink clock adjustment information according to the uplink clock information; and
a transmitter 1103, configured to send the uplink clock adjustment information to the terminal, so that the terminal adjusts clock information of the terminal according to the uplink clock adjustment information.

Figure 14:
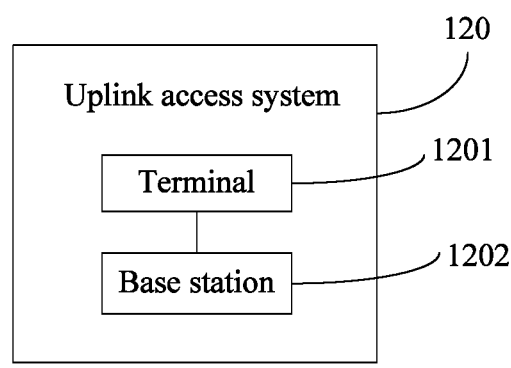
FIG. 14 is a simplified block diagram of another uplink access system according to an embodiment of the present application.

An embodiment of the present application provides an uplink access system 120. As shown in FIG. 14, the uplink access system 120 includes:

at least one terminal 1201, where the terminal 1201 is configured to:

obtain uplink service data; obtain a first codebook from a preset codebook set; obtain, according to the first codebook and a mapping relationship between a codebook and a pilot sequence, a first pilot sequence corresponding to the first codebook; generate an uplink data signal according to the first codebook and the uplink service data; generate a pilot signal corresponding to the first pilot sequence; and send the uplink data signal and the pilot signal to a base station 1202; and at least one base station 1202, where the base station 1202 is configured to:

receive an uplink data signal and a pilot signal that are from a terminal 1201, where:

the pilot signal is generated by the terminal according to a first pilot sequence, where the first pilot sequence is a pilot sequence corresponding to a first codebook that is obtained by the terminal according to the first codebook obtained from a preset codebook set and according to a mapping relationship between a codebook and a pilot sequence; and the uplink data signal is generated by the terminal according to the first codebook and uplink service data obtained by the terminal.

The uplink access system provided in this embodiment of the present application is applied to a terminal and a base station. After a terminal obtains uplink service data, when the terminal determines that a volume of the uplink service data is less than a preset data volume threshold, the terminal obtains a first codebook from the preset codebook set, obtains, according to the first codebook and a mapping relationship between a codebook and a pilot sequence, a first pilot sequence corresponding to the first codebook, generates an uplink data signal according to the first codebook and the uplink service data, generates a pilot signal corresponding to the first pilot sequence, and sends the uplink data signal and the pilot signal to the base station, and then the base station receives the uplink data signal and the pilot signal that are from the terminal. Compared with that in the prior art, a terminal may directly obtain a first codebook from a preset codebook set of the terminal, obtain, according to the first codebook and a mapping relationship between a codebook and a pilot sequence, a first pilot sequence corresponding to the first codebook, and generate an uplink data signal and a pilot signal. Before sending the uplink data signal and the pilot signal to a base station, the terminal does not need to interact with the base station to generate the uplink data signal and the pilot signal. This saves an information exchange process between the terminal and the base station, and particularly, effectively resolves a problem of a waste of resources that occurs because when a volume of uplink service data is relatively small, the terminal needs to interact with the base station to generate the uplink data signal and the pilot signal.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A method for a terminal device to transmit uplink service data to a base station, comprising:

obtaining the uplink service data;

obtaining a codebook from a preset codebook set, wherein each codebook in the preset codebook set is used for mapping a data block of S bits into a group of data modulation symbols, and wherein each codebook in the preset codebook set comprises a plurality of modulation symbol groups, each modulation symbol group corresponds to a data block, each modulation symbol group comprises a plurality of modulation symbols, and each modulation symbol corresponds to one element in a time-frequency resource block;

obtaining a pilot sequence corresponding to the codebook according to a mapping relationship between the codebook and the pilot sequence;

generating an uplink data signal according to the codebook and the uplink service data;

generating a pilot signal corresponding to the pilot sequence; and transmitting the uplink data signal and the pilot signal to the base station.

2. The method according to claim 1, wherein generating the uplink data signal according to the codebook and the uplink service data comprises:

mapping the uplink service data into one or more data modulation symbols according to the codebook; and generating the uplink data signal according to the data modulation symbols.

3. The method according to claim 1, wherein obtaining the pilot sequence corresponding to the codebook comprises:
obtaining the pilot sequence according to a mapping relationship between the codebook and a pilot sequence subset, wherein the pilot sequence belongs to the pilot sequence subset.

4. The method according to claim 1, wherein each codebook of the codebook set corresponds to one pilot sequence subset, each pilot sequence subset comprises at least one pilot sequence, and no same pilot sequence exists in two pilot sequence subsets that correspond to two different codebooks.

5. The method according to claim 1, wherein before obtaining the uplink service data, the method further comprises:
sending random access information to the base station, wherein the random access information comprises uplink clock information of the terminal device;
receiving uplink clock adjustment information from the base station, wherein the uplink clock adjustment information is generated by the base station according to the uplink clock information of the terminal device; and
adjusting clock information of the terminal device according to the uplink clock adjustment information.

6. A method for a base station to communicate with a terminal, comprising:
receiving an uplink data signal, wherein the uplink data signal is generated by the terminal according to a codebook obtained from a preset codebook set and uplink service data, wherein each codebook in the preset codebook set is used for mapping a data block of S bits into a group of data modulation symbols;
receiving a pilot signal, wherein the pilot signal is generated by the terminal according to a pilot sequence, wherein the codebook comprises a plurality of modulation symbol groups, each modulation symbol group corresponds to a data block, each modulation symbol group comprises a plurality of modulation symbols, and each of the multiple modulation symbols corresponds to one element in a time-frequency resource block;
obtaining the pilot sequence according to the pilot signal;
obtaining the codebook according to the pilot sequence and according to a mapping relationship between the codebook and the pilot sequence; and
obtaining the uplink service data according to the codebook.

7. The method according to claim 6, wherein the pilot sequence belongs to a pilot sequence subset, and wherein obtaining the codebook according to the pilot sequence comprises:
obtaining the codebook according to a mapping relationship between the codebook and the pilot sequence subset.

8. The method according to claim 7, wherein the codebook belongs to a preset codebook set, and wherein each codebook of the codebook set corresponds to one pilot sequence subset, each pilot sequence subset comprises at least one pilot sequence, and no same pilot sequence exists in two pilot sequence subsets that correspond to two different codebooks.

9. The method according to claim 6, wherein before receiving the uplink data signal and the pilot signal from the terminal, the method further comprises:
receiving random access information from the terminal, wherein the random access information comprises uplink clock information of the terminal;
generating uplink clock adjustment information according to the uplink clock information; and
sending the uplink clock adjustment information to the terminal, so that the terminal adjusts clock information of the terminal according to the uplink clock adjustment information.

10. A mobile terminal device, comprising a processor and a transmitter;
wherein the processor is configured to:
obtain uplink service data;
obtain a codebook from a preset codebook set of the terminal, wherein each codebook in the preset codebook set is used for mapping a data block of S bits into a group of data modulation symbols, and wherein each codebook in the preset codebook set comprises a plurality of modulation symbol groups, each modulation symbol group corresponds to a data block, each modulation symbol group comprises a plurality of modulation symbols, and each modulation symbol corresponds to one element in a time-frequency resource block;
obtain a pilot sequence corresponding to the codebook according to a mapping relationship between the codebook and a pilot sequence;
generate an uplink data signal according to the codebook and the uplink service data; and
generate a pilot signal corresponding to the pilot sequence;
and wherein the transmitter is configured to:
transmit the uplink data signal and the pilot signal to a base station.

11. The mobile terminal device according to claim 10, wherein in generating the uplink data signal according to the codebook and the uplink service data, the processor is configured to:
map the uplink service data into one or more data modulation symbols according to the codebook; and
generate the uplink data signal according to the data modulation symbols.

12. The mobile terminal device according to claim 10, wherein in obtaining the pilot sequence corresponding to the codebook, the processor is configured to:
obtain the pilot sequence according to a mapping relationship between the codebook and a pilot sequence subset, wherein the pilot sequence belongs to the pilot sequence subset.

13. The mobile terminal device according to claim 12, wherein each codebook of the codebook set corresponds to one pilot sequence subset, each pilot sequence subset comprises at least one pilot sequence, and no same pilot sequence exists in two pilot sequence subsets that correspond to two different codebooks.

14. The mobile terminal device according to claim 10, further comprising a receiver,
wherein the transmitter is further configured to send random access information to the base station, wherein the random access information comprises uplink clock information of the terminal device;
wherein the receiver is configured to receive the uplink clock adjustment information from the base station, wherein the uplink clock adjustment information is generated by base station according to the uplink clock information; and wherein the processor is further configured to adjust clock information of the terminal device according to the uplink clock adjustment information.

15. A base station, comprising a receiver and a processor; wherein the receiver is configured to:
    receive an uplink data signal, wherein the uplink data signal is generated by a terminal according to a codebook obtained from a preset codebook set and uplink service data, and wherein each codebook in the preset codebook set is used for mapping a data block of S bits into a group of data modulation symbols;
    receive a pilot signal, wherein the pilot signal is generated by the terminal according to a pilot sequence, wherein the pilot sequence corresponds to the codebook, wherein the codebook comprises a plurality of modulation symbol groups, each modulation symbol group corresponds to a data block, each modulation symbol group comprises a plurality of modulation symbols, and each modulation symbol corresponds to one element in a time-frequency resource block,
    wherein the processor is configured to:
        obtain the pilot sequence according to the pilot signal;
        obtain the codebook according to the pilot sequence and according to a mapping relationship between the codebook and the pilot sequence; and
        obtain the uplink service data according to the codebook.

16. The base station according to claim 15, wherein the pilot sequence belongs to a pilot sequence subset, and wherein in obtaining the codebook according to the pilot sequence, the processor is configured to:
    obtain the codebook according to a mapping relationship between the codebook and the pilot sequence subset.

17. The base station according to claim 16, wherein the codebook belongs to a preset codebook set, and wherein each codebook of the codebook set corresponds to one pilot sequence subset, each pilot sequence subset comprises at least one pilot sequence, and no same pilot sequence exists in two pilot sequence subsets that correspond to two different codebooks.

18. The base station according to claim 15, further comprising a transmitter,
    wherein the receiver is further configured to receive random access information from the terminal, wherein the random access information comprises uplink clock information of the terminal;
    wherein the processor is further configured to generate uplink clock adjustment information according to the uplink clock information; and
    wherein the transmitter is configured to send the uplink clock adjustment information to the terminal, so that the terminal adjusts clock information of the terminal according to the uplink clock adjustment information.

19. The method according to claim 1, wherein obtaining the codebook from the preset codebook set comprises obtaining the codebook from the preset codebook set in response to a volume of the uplink service data being less than a preset data volume threshold, and wherein: generating the uplink data signal, and generating the pilot signal, are performed:
    before transmitting the uplink data and the pilot signals to the base station; and
    in the absence of interacting with the base station.

20. The method according to claim 6, wherein the preset codebook set of the terminal is the same as a preset codebook set of the base station.

21. The mobile terminal device according to claim 11, wherein:
    the codebook is an SCMA codebook, and
    to map the uplink service data into one or more data modulation symbols according to the codebook, the processor is further configured to map the uplink service data to be sent from the terminal to the base station into one or more data modulation symbols.

22. The base station according to claim 15, wherein the preset codebook set of the terminal is the same as a preset codebook set of the base station.

* * * * *